United States Patent [19]
Perkey

[11] Patent Number: 5,711,145
[45] Date of Patent: Jan. 27, 1998

[54] COMBINED PRESSURIZING, FLOW MEASURING AND FLOW SPLITTING VALVE

[75] Inventor: Russell C. Perkey, Granger, Ind.

[73] Assignee: AlliedSignal, Inc., Morristown, N.J.

[21] Appl. No.: 540,509

[22] Filed: Oct. 10, 1995

[51] Int. Cl.$^6$ .............................. F02C 7/232; F02C 9/26
[52] U.S. Cl. .......................................... 60/39.281; 60/734
[58] Field of Search ...................... 60/39.281, 734; 73/861.52, 861.53, 861.54, 861.56, 861.62

[56] References Cited

U.S. PATENT DOCUMENTS

| | | | |
|---|---|---|---|
| 4,473,999 | 10/1984 | Smith | 60/39.281 |
| 5,033,311 | 7/1991 | Custer | 73/861.53 |
| 5,111,653 | 5/1992 | Leeson | 60/39.02 |
| 5,115,684 | 5/1992 | Haeussler | 73/861.54 |
| 5,274,996 | 1/1994 | Goff et al. | 60/39.281 |

FOREIGN PATENT DOCUMENTS

| | | |
|---|---|---|
| 2 696 211 | 4/1994 | France . |
| WO 94 15084 | 7/1994 | WIPO . |

OTHER PUBLICATIONS

Patent abstracts of Japan vol. 12, No. 039 (M–665), 5 Feb. 1988 & JP 62 191646 A (Honda Motor Co Ltd), 22.

*Primary Examiner*—Louis J. Casaregola
*Attorney, Agent, or Firm*—Larry J. Palguta

[57] ABSTRACT

A fuel system including a fuel pump for supplying fuel from a source through a variable orifice flow metering valve and then through a variable orifice pressurizing valve to an engine utilizes a determination of the pressurizing valve orifice area to ascertain the fuel flow through the pressurizing valve. The pressurizing valve includes a movable piston with a piston section movable linearly to open and close selectively an orifice. The pressurizing valve may take the form of a cylindrical cavity with the piston reciprocable therein. The cavity is provided with an Inlet port and at least one sidewall outlet port and the piston section slidable along the sidewall outlet port to increase and decrease selectively the effective size of the orifice. A transducer is coupled to the piston to provide an indication of piston position. A second piston section for opening and closing selectively a second orifice may be provided. The piston has one extreme position where both orifices are open, another extreme position where both orifices are closed, a first range of positions where the size of one orifice varies while the other orifice remains closed, and a second range of positions where the sizes of both orifices vary. A linear relationship between orifice area and piston position occurs wherever the outlet ports have a substantially constant circumferential dimension.

9 Claims, 3 Drawing Sheets

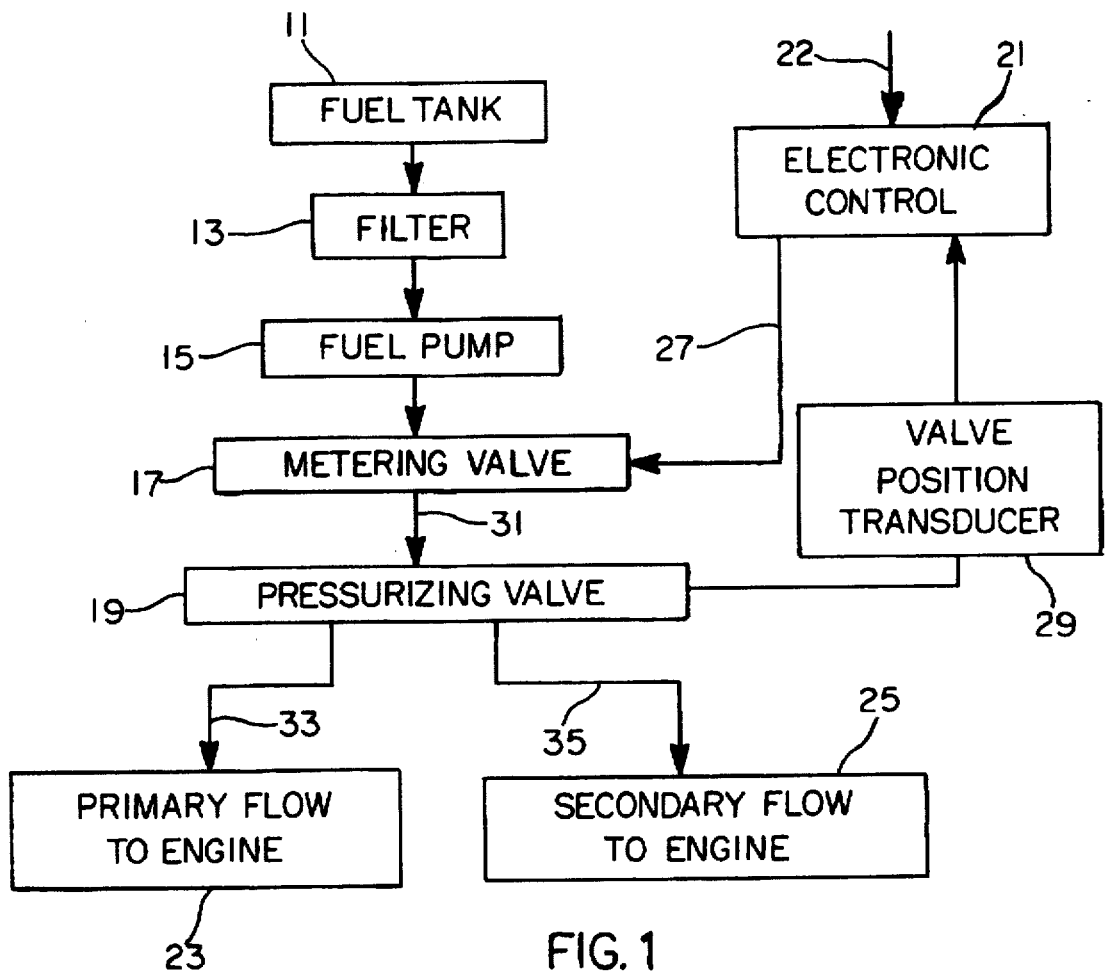
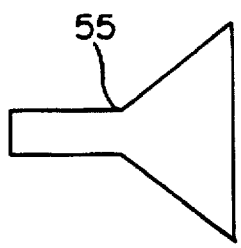
FIG. 1
FIG. 3c

COMBINED PRESSURIZING, FLOW MEASURING AND FLOW SPLITTING VALVE

SUMMARY OF THE INVENTION

The present invention relates generally to flow controls and more particularly to a fluid control valve which both measures and controls fluid flow.

In aircraft fuel control systems, accurate control of fuel flow is important for fuel economy. It Is known to accurately control fuel flow by measuring the flow and controlling accordingly a variable orifice metering valve. A typical system has a fuel pump supplying fuel from a tank by way of the metering valve and a subsequent pressurizing valve to an engine. An electronic control receives commanded fuel flow as well as a measure of actual fuel flow from a flow meter and controls the metering valve to maintain the two values for fuel flow close to one another. It would be highly desirable to eliminate the separate flow meter while retaining its function in such a system.

Some aircraft engines have separate primary and secondary fuel inlet manifolds and their fuel systems employ separate valves for supplying fuel to the individual manifolds with low level fuel supplies being directed only to the primary manifold while both manifolds receive fuel at higher flow rates. It would be highly desirable to combine the separate valves while maintaining the ability to direct fuel to only one, or to both manifolds as desired.

The present invention provides solutions to the above by controlling the supply of fuel to primary and secondary intake manifolds of an engine through a dual orifice pressurizing valve having a movable piston with a first piston section for opening and closing selectively a first orifice which controls fuel flow to the primary manifold, and a second piston section for opening and closing selectively a second orifice which controls fuel flow to the secondary manifold. The piston has one extreme position where both orifices are open, another extreme position where both orifices are closed, a first range of positions where the size of one orifice varies while the other orifice remains closed and a second range of positions where the sizes of both orifices vary. A piston position transducer provides an indication of piston movement which is translated into a measure of fuel flow to the engine manifolds.

BRIEF DESCRIPTION OF THE DRAWING

FIG. 1 is schematic representation of an aircraft fuel system;

FIGS. 3a–3c are illustrations of preferred cylindrical sidewall port configurations;

Corresponding reference characters indicate corresponding parts throughout the several views of the drawing.

DESCRIPTION OF THE INVENTION

Figure 2A:
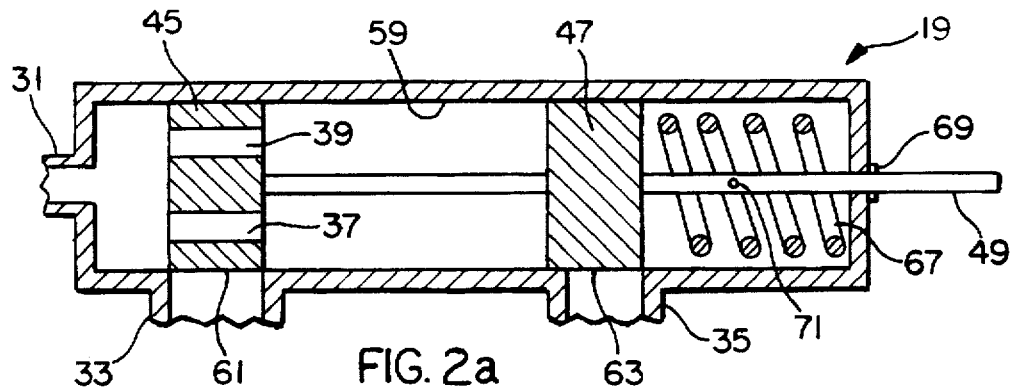
FIGS. 2a–2c are highly simplified views in cross-section illustrating sequential operation of the pressurizing valve of FIG. 1.

In FIG. 1, a portion of a fuel system having a fuel pump 15 for supplying fuel from a fuel tank source 11 through a filter 13 to a variable orifice flow metering valve 17 and then through a pressurizing valve 19 to an engine is shown. Such systems typically employ a separate flowmeter for providing flow level feedback information to electronic control unit 21. This feedback information is compared to a commanded flow level on line 22 and the metering valve orifice is appropriately modified to accurately control the metering valve 17 so that the determined fuel flow more nearly coincides with the desired fuel flow indicated by input 22. In those cases where fuel is supplied to the engine at more than one inlet port, separate valving is employed to control flow to the separate intake manifolds. In the present invention, a measure of the pressurizing valve orifice area is provided by valve position transducer 29 which may, for example, be a linear variable differential transformer.

Figure 2B:
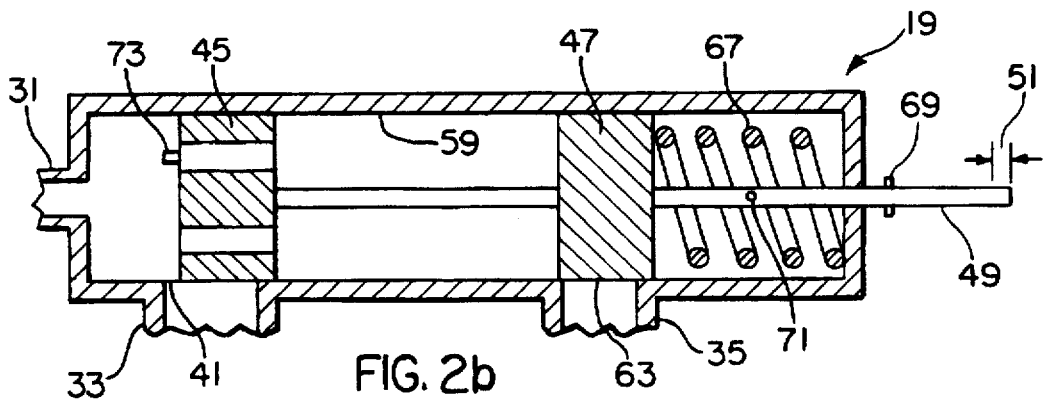
Figure 2C:
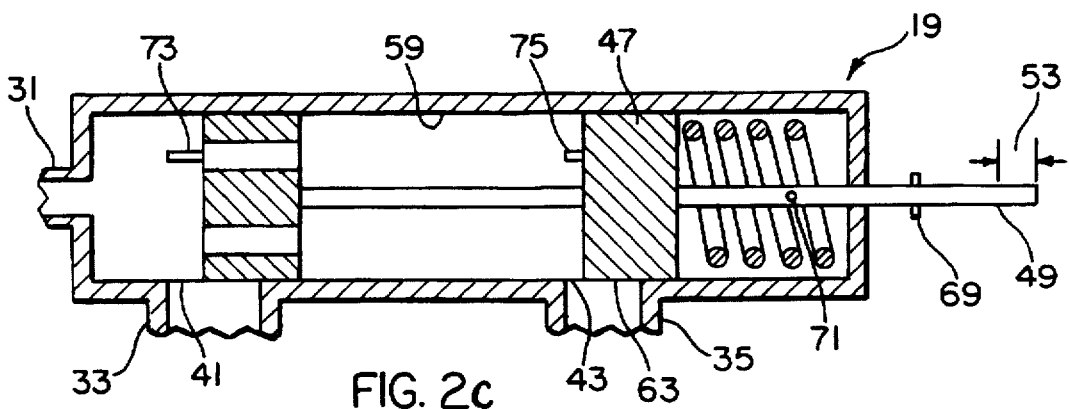

In FIG. 1, the pressurizing valve 19 functions to supply both a primary intake manifold as indicated at 23 and a secondary engine intake manifold as indicated at 25. The way in which this pressurizing valve provides both functions Is illustrated in FIGS. 2a–2c. A linearly movable piston has two piston sections 45 and 47 fixed to piston rod 49. The piston is movable linearly within the cylindrical cavity 59. Fuel from the metering valve 17 is supplied to the inlet port 31. In FIG. 2a, both outlet ports 61 and 63 are closed by their respective piston sections 45 and 47, hence, there is no fuel flow through conduits 33 and 35 to the engine. In FIG. 2b, the piston has moved against the urging of spring 67 toward the right a distance indicated by 51. This distance is, of course, sensed by transducer 29 and supplied to the electronic control unit 21. A portion of port 61 is now opened forming orifice 41 through which fuel flows by way of conduit 33 to the engine. Further rightward piston motion increases the size of orifice 41 and opens port 63 to provide a second orifice 43 through which secondary manifold fuel flows as indicated by FIG. 2c. A number of like ports may be angularly-spaced about the cylindrical surface 59. FIGS. 2b and 2c assume three such primary ports spaced 120 degrees from one another, only two of which (61 and 73) are visible. Similarly, these Figures assume three but show only two secondary ports 63 and 75 spaced from one another by 120 degrees. When orifice area is measured, it is the sum of three individual opening areas. There are a number of passageways such as 37 and 39 in piston section 45 for allowing fuel to flow from inlet port 31 to the orifice 43. In FIG. 2c, the piston has moved from its closed position (FIG. 2a) a distance indicated at 53. The transducer 29 is coupled to the piston rod 49 and provides an indication of the distance 53 to the electronic control unit 21.

Figure 3A:
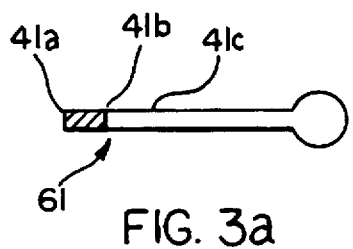
Figure 3B:
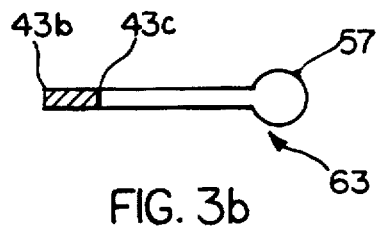

Preferred shapes for the sidewall outlet ports 61 and 63 are shown in FIGS. 3a and 3b. The outlet ports 61 and 63 have a substantially constant circumferential dimension (the vertical dimension of FIGS. 3a and 3b) throughout most of their axial (horizontal dimension in FIGS. 3a and 3b) extent thereby providing a substantially linear relationship between orifice area and piston position. So long as the pressure drop across the orifice is constant, fuel flow is directly proportional to area and area is directly proportional to the distance moved by the piston, hence, flow is simply a constant times the distance sensed by transducer 29. When the circular region 57 starts to open, the relationship becomes nonlinear. The circular region is provided to achieve full fuel flow near the end of the piston travel with a relatively more limited piston motion as will be discussed in greater detain in conjunction with FIG. 3c.

FIGS. 3a and 3b are not to the same scale as FIGS. 2a–2c; the ports appear nearly twice as large as in FIGS. 2a–2c. Orifice 41 is closed in FIG. 2a as indicated by end position 41a in FIG. 3a. In FIG. 2b, the left edge of piston section 45 has moved to the position 41b in FIG. 3a and forms the orifice indicted by crosshatching. When the piston has moved the distance 53 in FIG. 2c, the left edge of right piston section 47 is at position 43c in FIG. 3b and forms the crosshatched orifice of FIG. 3b. At this time, orifice 41 extends to position 41c of FIG. 3a. The pistons have an extreme leftward position as illustrated by FIG. 2a where both orifices 41 and 43 are closed. There is a range of positions within distance 51 between FIGS. 2a and 2b where the size of orifice 41 varies while orifice 43 remains closed. There Is a second range of positions including distance 53 of FIG. 2c where the sizes of both orifices vary. When the left edge of right piston section 47 clears the circular portion 57, the piston section is effectively at Its rightmost extreme and both orifices are fully open. Stops such as transverse pins 69 and 71 determining the extreme positions may be provided if desired.

Of course, as spring 67 (FIG. 2a) is compressed, the pressure drop across the orifice increases somewhat. However, at relatively low flow rates this change is not great and may be ignored or may be compensated for in the computation of flow rate by the electronic controller 21. Thus, in the lower flow ranges, the pressure drop across the valve 19 Is substantially constant and the relationship between fuel flow and piston position is substantially linear throughout the first range and a portion of the second range up to the point where the circular region 57 begins to open. The linear relationship in the first range is $f=k_1*d$ and the linear relationship in the portion of the second range is $f=k_2*d$ where represents the flow rate, d represents the distance of the piston from its initial opening location, e.g., 51 or 53, and $k_1$ and $k_2$ are constants with $k_2$ being greater than $k_1$. With ports 61 and 63 being of the same circumferential extent, $k_2=2*k_1$.

Figure 4:
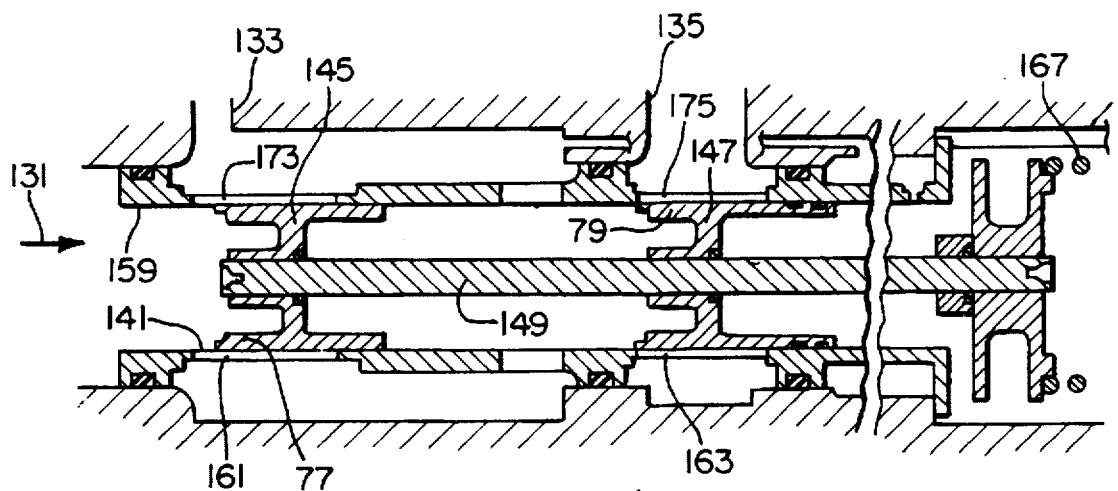
FIG. 4 is a view in cross-section of one preferred embodiment of the pressurizing valve of FIG. 1.

A preferred form of a pressurizing valve which incorporates the primary and secondary engine flow feature is illustrated in FIG. 4. Component parts of the valve of FIG. 4 having functional counterparts in FIGS. 2a–2c bear reference numerals which are 100 greater than the reference numerals of the corresponding parts of FIGS. 2a–2c. In FIG. 4, the piston section 145 has a skirt 77 which uncovers outlet ports 161 and 173 as the piston moves toward the right. There are at least two angularly spaced primary outlet ports 161 and 173, and at least two angularly spaced secondary outlet ports 163 and 175. The skirt 79 of piston portion 147 uncovers outlet ports 163 and 175, but is timed to begin to open only when the primary flow has reached a desired level. In one preferred embodiment, this desired level was about 70 pph (pounds per hour). Fuel flow is axially from the left in the direction of arrow 131. The flow to the primary manifold exits the vane through conduit 133 while the secondary flow is through conduit 135.

Figure 5:
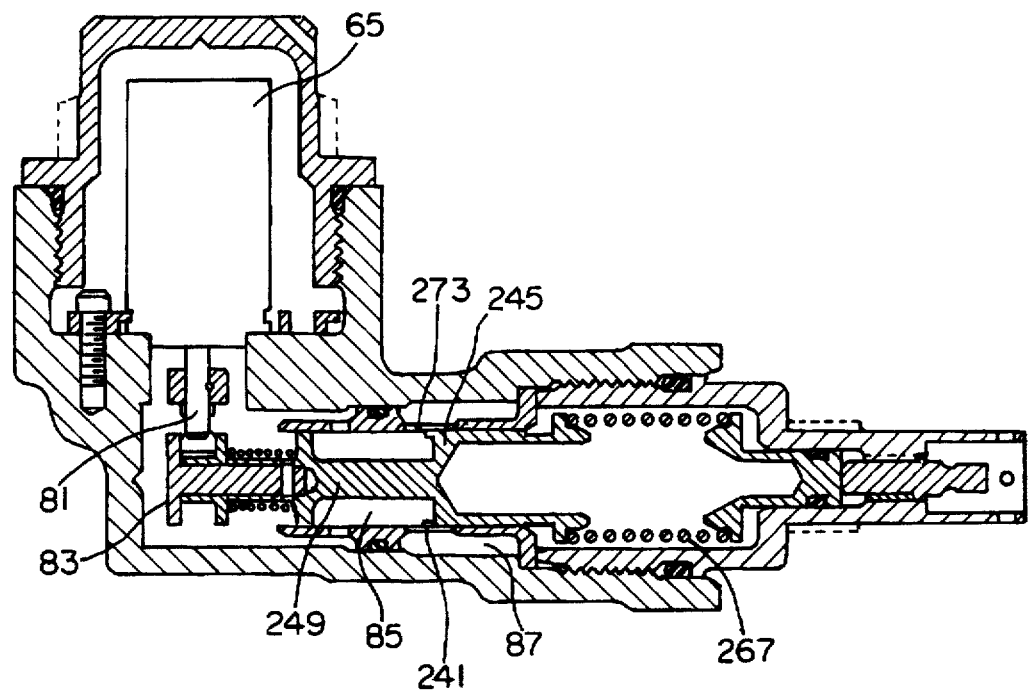
FIG. 5 is a view in cross-section of another preferred embodiment of the pressurizing valve of FIG. 1.

FIG. 5 illustrates another preferred form of a pressurizing valve having only one fuel flow outlet. Component parts of the valve of FIG. 5 having functional counterparts in FIGS. 2a–2c bear reference numerals which are 200 greater than the reference numerals of the corresponding parts of FIGS. 2a–2c. Comparing FIGS. 4 and 5, it is clear that either could be modified to incorporate features of the other. Rather than the linear variable differential transformer 29 suggested in FIG. 1, the transducer 29 may comprise a resolver 65. Resolver 65 is simply the angular analog of the linear variable differential transformer discussed in conjunction with FIG. 1. The resolver 65 receives its angular input by way of a drive pin 81 which engages the spool and collar arrangement 83 which translates axial motion of piston rod 249 into angular motion of pin 81. Fuel enters through conduits connecting to the chamber 85 and exits through conduits connecting to the chamber 87. The piston section 245 again has a skirt which selectively opens the orifices or ports 241 and 273 as the piston section moves toward the right against the force of spring 267.

As a specific example, assume the Initial opening of the pressurizing valve occurs where the pressure drop thereacross is 100 psi and that the desired flow range is from 20 pph to 500 pph. The initial area is then $1.7 \times 10^{-4}$ sq. in. If the metering slot is 0.02 inches wide, the initial opening distance moved by the piston would be 0.0085 inches. The stroke or overall distance moved by the piston for a flow of 150 pph would be 0.0639 inches if the pressure drop across the orifice remained constant. If the spring 267 has a spring rate of 15 pounds per inch, the pressure drop across the orifice will actually be 108 psi and the actual stroke will be closer to 0.0615 inches.

FIG. 3c illustrates one shape for each of a pair of ports 241 and 273 which implements the forgoing example and avoids the need for a long piston stroke to achieve high flow rates. The rectangular portion of this port to the left of point 55 is 0.010 inches high and 0.0615 inches wide. The overall width of the port is 0.10 inches. The height at the extreme right edge is 0.036 inches. The piston section 245 uncovers or opens this port as the piston section moves from left to right. The area is a linear function of the distance the piston moves up to the point 55 at which time the area begins to vary as the square of the additional distance the piston moves.

What is claimed is:

1. A fuel system having a fuel pump for supplying fuel from a source through a variable orifice flow metering valve and then through a variable orifice pressurizing valve to an engine, the pressurizing valve comprising means for measuring pressurizing valve orifice area to provide the combined functions of valve orifice area measurement and fuel pressurization in one unit, and the system further including means utilizing the measured area to ascertain the fuel flow through the pressurizing valve.

2. The improvement of claim 1, wherein the pressurizing valve includes a movable piston with a piston section movable linearly to open and close selectively an orifice, the means for measuring including a transducer coupled to the piston to provide an indication of piston position.

3. The improvement of claim 2, further including a second piston section for selectively opening and closing a second orifice, the piston having one extreme position where both orifices are open, another extreme position where both orifices are closed, a first range of positions where the size of one orifice varies while the other orifice remains closed and a second range of positions where the sizes of both orifices vary.

4. The improvement of claim 3, wherein the pressurizing valve includes a cylindrical cavity with the piston sections reciprocable therein, the cylindrical cavity including an inlet port and at least two sidewall outlet ports comprising the orifices, the piston sections being slidable along their respective outlet ports to increase and decrease selectively the effective sizes of the orifices.

5. The improvement of claim 4, wherein the outlet ports have a substantially constant radial dimension throughout most of their axial extent thereby providing a linear relationship between orifice area and piston section position.

6. The improvement of claim 1, further comprising an improved feedback flow control arrangement comprising:

electronic control means including means utilizing the measured orifice area for determining fuel flow, for comparing the determined fuel flow with a desired fuel